(12) United States Patent
Jin (10) Patent No.: US 9,823,800 B2
(45) Date of Patent: Nov. 21, 2017

(54) INTEGRATED TOUCH DISPLAY PANEL AND MANUFACTURING METHOD THEREOF

(71) Applicants: SHANGHAI AVIC OPTO ELECTRONICS CO., LTD., Shanghai (CN); TIANMA MICRO-ELECTRONICS CO., LTD., Shenzhen (CN)

(72) Inventor: Huijun Jin, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 53 days.

(21) Appl. No.: 15/173,924

(22) Filed: Jun. 6, 2016

(65) Prior Publication Data

US 2017/0220149 A1  Aug. 3, 2017

(30) Foreign Application Priority Data

Jan. 29, 2016 (CN) .......................... 2016 1 0067448

(51) Int. Cl.
*G06F 3/044* (2006.01)
(52) U.S. Cl.
CPC .... *G06F 3/044* (2013.01); *G06F 2203/04103* (2013.01)
(58) Field of Classification Search
CPC ................. G06F 3/044; G06F 2203/04103
See application file for complete search history.

(56) References Cited

U.S. PATENT DOCUMENTS

| 2003/0090614 | A1* | 5/2003 | Kim | G09G 3/3688 349/149 |
| 2008/0174580 | A1* | 7/2008 | Chang | G09G 3/3677 345/205 |
| 2011/0267293 | A1* | 11/2011 | Noguchi | G06F 3/0416 345/173 |
| 2013/0335367 | A1* | 12/2013 | Kim | G09G 3/3696 345/174 |

(Continued)

FOREIGN PATENT DOCUMENTS

CN         102236464 A       11/2011

*Primary Examiner* — Nicholas Lee
*Assistant Examiner* — Robert Stone
(74) *Attorney, Agent, or Firm* — Kilpatrick Townsend & Stockton LLP (57) ABSTRACT

The present disclosure describes an integrated touch display panel and a manufacturing method thereof. The integrated touch display panel comprises a gate drive circuit positioned at an edges of two opposite sides of a first substrate, multiple scanning lines are alternately connected to the gate drive circuit positioned at the edges of two sides, and each scanning line is connected with one of the shift register units. There exists at least one scanning line. The pull up/pull down characteristics of a pull up transistor/pull down transistor of the shift register unit connected with the at least one scanning line are different from the pull up/pull down characteristics of a pull up transistor/pull down transistor of the shift register unit connected with a scanning line adjacent to the at least one scanning line.

18 Claims, 9 Drawing Sheets

(56) References Cited

U.S. PATENT DOCUMENTS

| | | | |
|---|---|---|---|
| 2014/0015770 A1* | 1/2014 | Lee | G06F 3/041 |
| | | | 345/173 |
| 2016/0202534 A1* | 7/2016 | Chen | G02F 1/1339 |
| | | | 349/43 |

* cited by examiner

INTEGRATED TOUCH DISPLAY PANEL AND MANUFACTURING METHOD THEREOF

CROSS-REFERENCES

This application claims the priority of Chinese Patent Application NO. CN201610067448.4, filed on Jan. 29, 2016, the entire contents of which are incorporated herein by reference.

TECHNICAL FIELD

The present disclosure relates to the field of display technology, and in particular to an integrated touch display panel and a manufacturing method thereof.

BACKGROUND

With the development of modern electronic technologies, a corresponding structure may be disposed in a display panel of a display device to implement a corresponding function. For example, a touch structure may be disposed to implement the touch function, thereby bring convenience of application to users.

At present, in order to reduce the thickness of the display panel and implement the touch function, generally the touch structure is integrated into the display panel. When a capacitive touch structure is used, a touch electrode in the capacitive touch structure may be directly fabricated on the same substrate together with the display structure.

Figure 1:
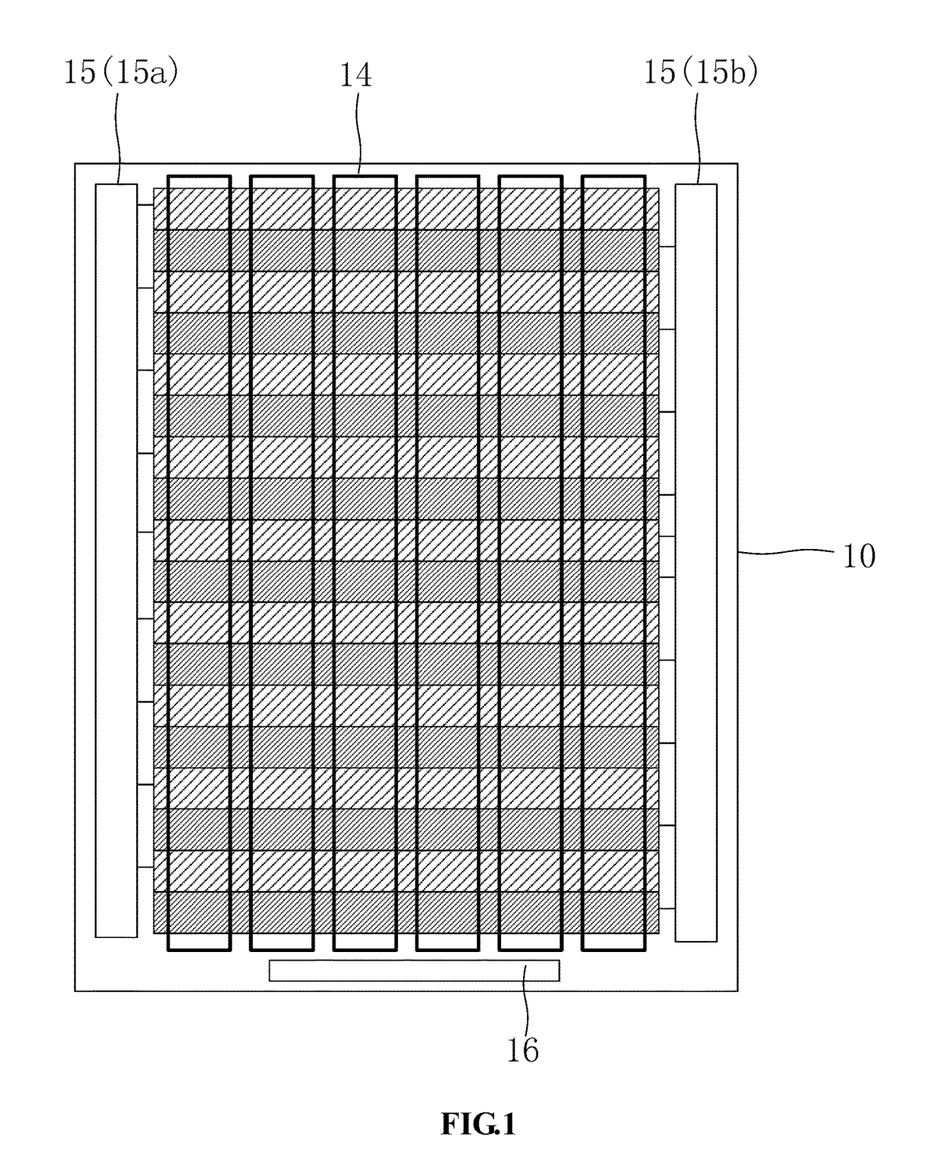
FIG. 1 is a schematic top view of a common integrated touch display panel in the related art.

Please refer to FIG. 1, which is a schematic top view of a common integrated touch display panel in the related art. On an array substrate 10 of the integrated touch display panel, there is provided with multi-line pixel units. The pixel units generally are formed by making scanning lines extending along the diagrammatic horizontal direction and data lines extending along the diagrammatic vertical direction intersect. In the related art, in order to adapt to a diversified display, a border generally needs to be narrowed. Therefore, in most cases, an integrated gate drive circuit 15 is disposed at two sides of the array substrate 10 to drive the scanning lines on the array substrate. As shown in FIG. 1, a first gate drive circuit 15a and a second gate drive circuit 15b are respectively disposed at the left side and the right side. In this way, odd rows of scanning lines and even rows of scanning lines may be respectively connected to the gate drive circuits positioned at different sides. On the array substrate, there is further provided with strip-shaped common electrodes extending along the diagrammatic vertical direction and multiplexed as touch electrodes. Therefore, the thickness of the display panel may be reduced and the touch function may be implemented.

However, in the process of an alignment laminating of the array substrate 10 and a counter substrate, a frame sealing glue needs to be coated over the periphery and cured by ultraviolet rays. However, the position on which the frame sealing glue is coated is just close to the gate drive circuit. Thus, ultraviolet irradiation may deteriorate a semiconductor of a thin film transistor (TFT) in the gate drive circuit so that a photoelectric characteristic deteriorate. In addition, two TFTs relatively far from each other may have larger deterioration difference degree. The first gate drive circuit 15a and the second gate drive circuit 15b are positioned at different sides of the array substrate. Therefore, the difference between the TFTs of the first gate drive circuit 15a and the TFTs of the second gate drive circuit 15b is larger in output characteristics. When they output drive signals to the scanning lines, there is difference between outputted signals. Odd rows of scanning lines and even rows of scanning lines are respectively connected to the gate drive circuits at different sides, so the difference of driving voltages on the two adjacent scanning lines causes different gate voltages of the TFTs of the pixel units connected to these two adjacent scanning lines, different source-drain currents of the pixel units, different display brightnesses of odd rows of pixels and even rows of pixels under the same data line signal, and causes horizontal fringes Mura.

SUMMARY

On this account, the present disclosure provides an integrated touch display panel and a manufacturing method thereof.

The present disclosure provides an integrated touch display panel that includes a first substrate, multiple pixel units, a gate drive circuit, and/or any other components. The multiple pixel units positioned in a display area on the first substrate. The pixel unit is defined by making two adjacent scanning lines and two adjacent data lines intersect. The scanning lines extend along a first direction, and the data lines extend along a second direction. The first direction is perpendicular to the second direction. A gate drive circuit positioned at the edge of two sides of the first substrate parallel to the second direction. The gate drive circuit includes multiple cascade-connected shift register units. The shift register unit includes a pull down transistor and a pull up transistor. The multiple scanning lines are alternately connected to the gate drive circuit positioned at the edge of two sides, and each of the scanning lines is connected with one of the shift register units. The pixel unit includes a first pixel unit and a second pixel unit which are adjacent along the second direction; the first pixel unit includes a first strip-shaped pixel electrode, the second pixel unit includes a second strip-shaped pixel electrode; an extension direction of the first strip-shaped pixel electrode and an extension direction of the second strip-shaped pixel electrode are essentially symmetrical with respect to the first direction; the first pixel unit is connected to a scanning line connected with the first gate drive circuit, and the second pixel unit is connected to a scanning line connected with a second gate drive circuit;

There exists at least one scanning line, and pull up/pull down characteristics of the pull up transistor/pull down transistor of the shift register unit connected with the at least one scanning line are different from pull up/pull down characteristics of the pull up transistor/pull down transistor of the shift register unit connected with a scanning line adjacent to the at least one scanning line. Multiple strip-shaped common electrodes serving as touch drive electrodes in a touch stage. A second substrate arranged oppositely to the first substrate. A frame sealing glue disposed at the edges of an opposite surfaces of the first substrate and the second substrate. A liquid crystal layer sandwiched in accommodating space formed among the first substrate, the second substrate and the frame sealing glue.

The present disclosure further provides a manufacturing method of an integrated touch display panel. The method includes providing a first substrate, forming multiple pixel units and a drive circuit on the first substrate. The pixel units are positioned in a display area on the first substrate and defined by making two adjacent scanning lines and two adjacent data lines intersect. The scanning lines extend along a first direction, the data lines extend along a second direction, and the first direction is perpendicular to the second direction. The gate drive circuit is positioned at the edge of two sides of the first substrate parallel to the second direction, and the gate drive circuit includes multiple cascade-connected shift register units. The shift register unit includes a pull down transistor and a pull up transistor. The multiple scanning lines are alternately connected to the gate drive circuit positioned at the edge of two sides, and each of the scanning lines is connected with one of the shift register units. The pixel unit includes a first pixel unit and a second pixel unit which are adjacent along the second direction. The first pixel unit includes a first strip-shaped pixel electrode, and the second pixel unit includes a second strip-shaped pixel electrode; the extension direction of the first strip-shaped pixel electrode and an extension direction of the second strip-shaped pixel electrode are essentially symmetrical with respect to the first direction; the first pixel unit is connected to the scanning lines connected with the first gate drive circuit, and the second pixel unit is connected to the scanning lines connected with a second drive circuit. There exists at least one scanning line, and pull up/pull down characteristics of the pull up transistor/pull down transistor of the shift register unit connected with the at least one scanning line are different from pull up/pull down characteristics of the pull up transistor/pull down transistor of the shift register unit connected with a scanning line adjacent to the at least one scanning line. Multiple strip-shaped common electrodes serve as touch drive electrodes in a touch stage. The manufacturing method further includes providing a second substrate, and performing alignment laminating on the first substrate and the second substrate by means of a frame sealing glue, the frame sealing glue is disposed at the edges of the opposite surfaces of the first substrate and the second substrate; and a liquid crystal layer is disposed in accommodating space formed among the first substrate, the second substrate and the frame sealing glue.

Comparing with the related art, the present disclosure at least has one of the following prominent advantages. By means of the integrated touch display panel provided by the present disclosure in combination with the integrated touch display function and a pseudo dual-domain pixel structure and in coordination with arrangement of polarizers at the outer side of the display panel, the display panel is enabled to generate horizontal interference fringes, which will be counteracted with horizontal coupling fringes generated by different transistor characteristics of the shift registers in the gate drive circuit through mutual interference, so that the difference of the brightness transmittance between odd rows of data lines and even rows of data lines under the same signal becomes smaller, thereby improving the display effect.

DETAILED DESCRIPTION OF THE EMBODIMENTS

To make the objectives, features, and advantages of the present disclosure clearer and more intelligible, the present disclosure will further be described with reference to the accompanying drawings and the embodiments.

It is to be noted that in the following description, concrete details are expounded to fully understand the present disclosure. However, the present disclosure may be implemented in many other manners different from what is described herein, and persons skilled in the art may make similar promotion without departing from the connotation of the present disclosure. Therefore, the present disclosure is not limited by specific embodiments disclosed in the following.

Figure 2:
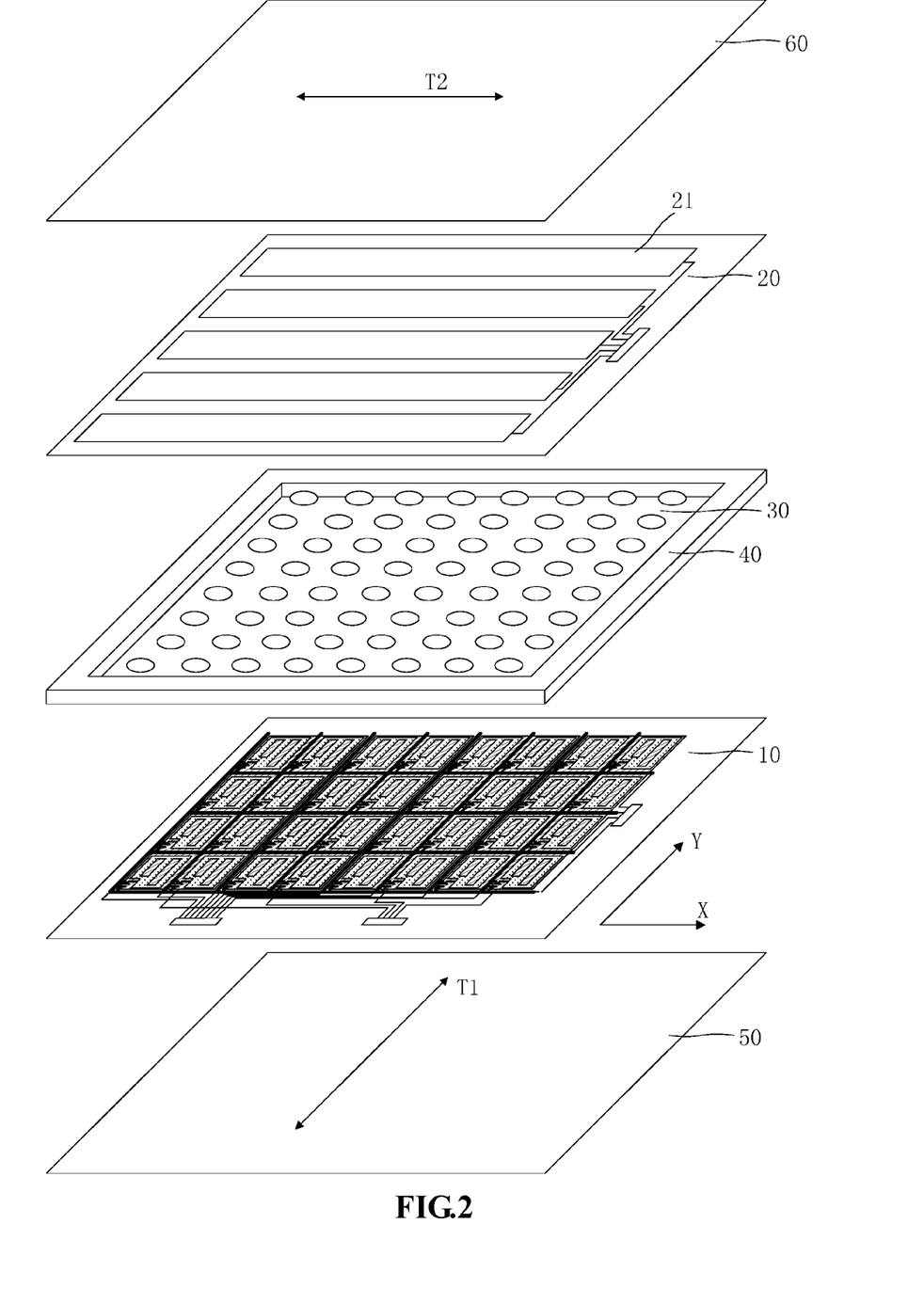
FIG. 2 is a schematic view of an exploded structure of an integrated touch display panel according to an embodiment of the present disclosure.
Figure 3:
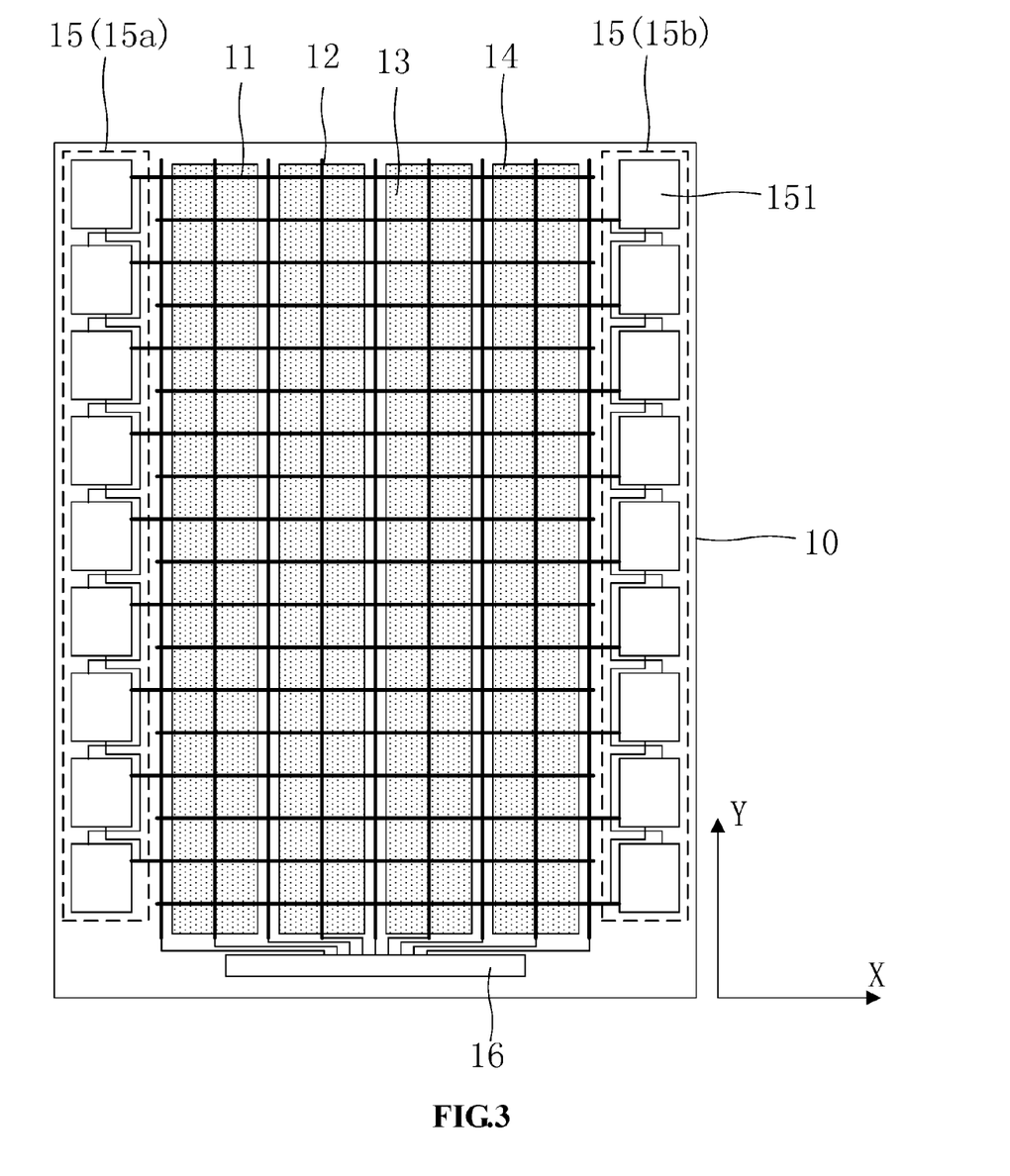
FIG. 3 is a schematic top view of a first substrate in FIG. 2.

Referring to FIG. 2 and FIG. 3, FIG. 2 is a schematic view of an exploded structure of an integrated touch display panel according to an embodiment of the present disclosure, and FIG. 3 is a schematic top view of a first substrate in FIG. 2.

The integrated touch display panel provided by this embodiment includes: a first substrate 10. The first substrate 10 is a glass substrate. In other embodiments, the first substrate also may be other transparent substrate, for example, a quartz substrate. An intermediate region on the first substrate is the display area on which multiple pixel units 13 are formed. The pixel units 13 is defined by making two adjacent scanning lines 11 and two adjacent data lines 12 intersect. On the array substrate 10, multiple scanning lines 11 extending along a first direction X are disposed. The first direction X is the horizontal direction as shown in FIG. 3, and multiple data lines 12 extending along a second direction Y are also disposed. The first direction X is perpendicular to the second direction Y. The multiple scanning lines 11 and the multiple data lines 12 are intersected to form a pixel unit array.

Figure 4A:
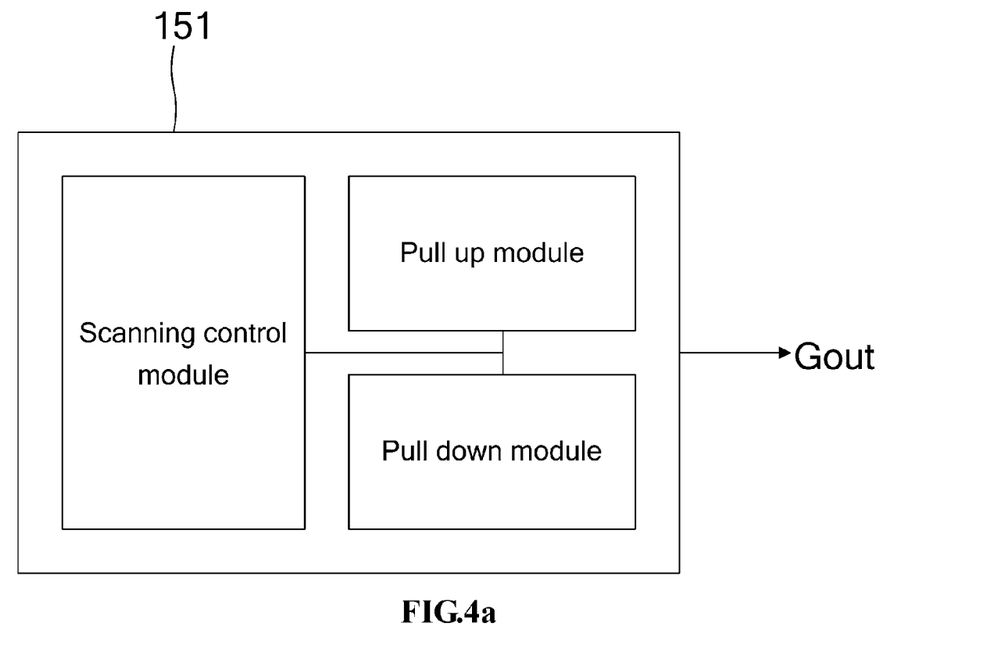
FIG. 4a is a schematic structural view of a shift register unit in FIG. 3.

A gate drive circuit 15 is disposed at the edge of two sides of the first substrate 10 parallel to the second direction Y. The gate drive circuit 15 includes a first gate drive circuit 15a positioned at a first side and a second gate drive circuit 15b positioned at a second side opposite to the first side. The gate drive circuit 15 includes multiple cascade-connected shift register units 151. Refer to FIG. 4a, FIG. 4a is a schematic structural view of a shift register unit in FIG. 3. In this embodiment, the shift register unit 151 includes a scanning control module, a pull up module and a pull down module. Each module includes at least one transistor. The scanning control module controls a forward scanning and a backward scanning of the shift register unit, the pull up module outputs a high level signal to an output end, and the pull down module outputs a low level signal to the output end. In this embodiment, all the transistors included in the shift register unit are NMOS transistors, a switching characteristic of the NMOS transistors are switched off at a low level and switched on at a high level. Therefore, in this embodiment, the high level signal refers to a level signal that may enable the NMOS transistors to be switched on, and the low level signal refers to a level signal that may enable the NMOS transistors to be switched off. The pull up module includes a pull up transistor whose output end is connected with the output end Gout of the shift register unit 151 to output the high level signal. The pull down module includes a pull down transistor whose output end is connected with the output end Gout of the shift register unit 151 to output the low level signal.

The multiple scanning lines 11 are alternately connected to the gate drive circuit 15 positioned at the edges of two sides, and each of the scanning lines 11 is connected with a shift register unit 151. In this embodiment, odd rows of scanning lines are connected to the first gate drive circuit 15a on the left side of FIG. 3, and even rows of scanning lines are connected to the second gate drive circuit 15b on the right side of FIG. 3.

Figure 4B:
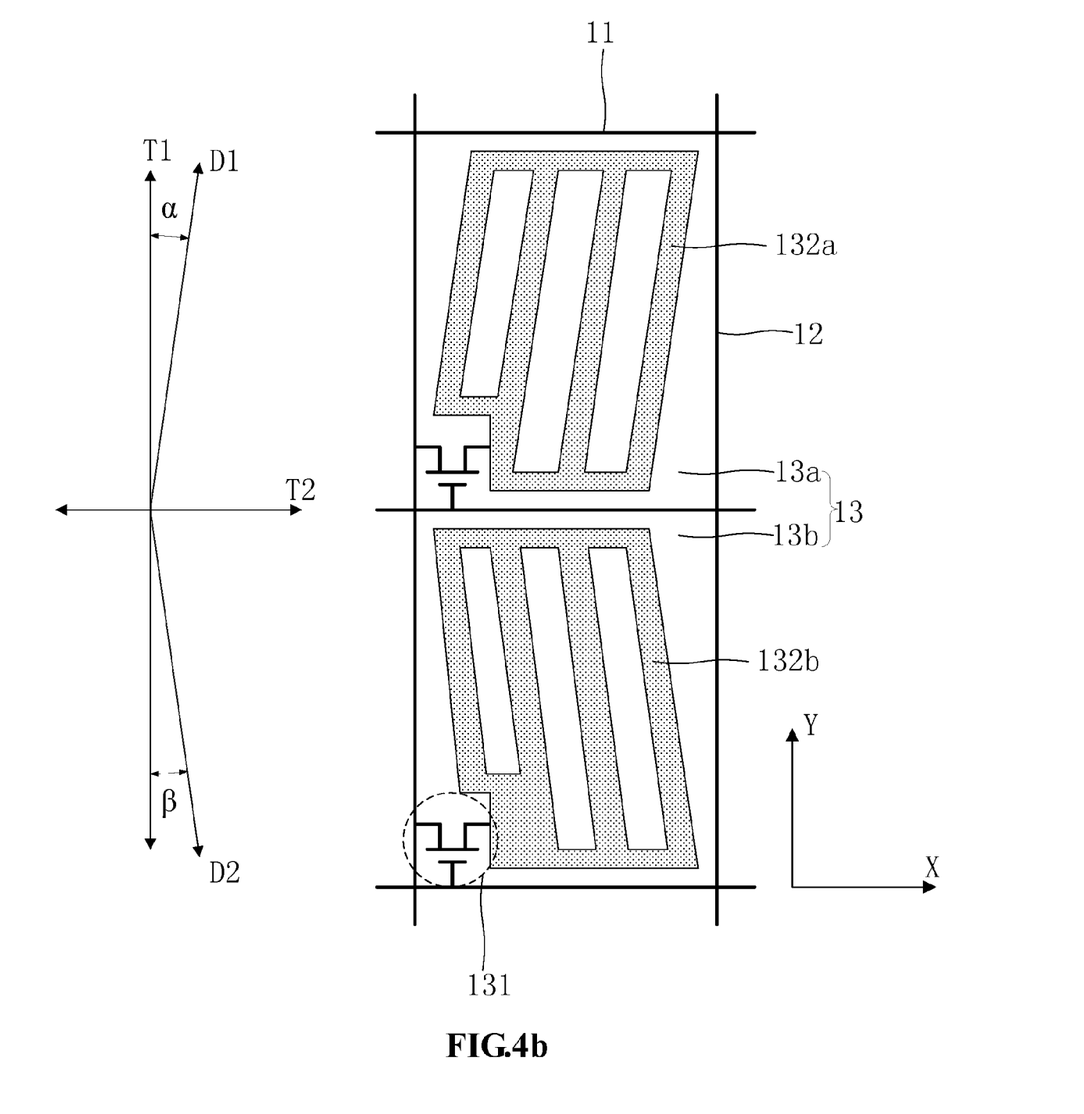
FIG. 4b is an enlarged schematic structural view of a pixel unit in FIG. 3.

The pixel unit 13 includes a first pixel unit and a second pixel unit which are adjacent along the second direction Y. Refer to FIG. 4b, which is an enlarged schematic structural view of the pixel unit in FIG. 3. The pixel unit 13 includes a first pixel unit 13a and a second pixel unit 13b which are adjacent along the second direction Y. The first pixel unit 13a includes a first strip-shaped pixel electrode 132a. The second pixel unit 13b includes a second strip-shaped pixel electrode 132b. The extension direction D1 of the first strip-shaped pixel electrode 132a and the extension direction D2 of the second strip-shaped pixel electrode 132b are essentially symmetrical with respect to the first direction X. The pixel unit 13 further includes a thin film transistor 131, a gate, a source electrode and a drain electrode of the thin film transistor 131 are connected to the scanning line 11, the data line 12, and the pixel electrode, respectively. The first pixel unit 13a is connected to the scanning lines connected with the first gate drive circuit 15a, and the second pixel unit 13b is connected to the scanning lines connected with the second drive circuit 15b. That is, all odd rows of scanning lines are connected to the first pixel unit 13a, and all even rows of scanning lines are connected to the second pixel unit 13b, in other words, the pixel electrodes of odd rows of pixel units are opposite to those of even rows of pixel units in oblique direction. In the display panel using this structure, because the strip-shaped pixel electrodes of two adjacent rows of pixel units are opposite in oblique direction, after the drive signal is inputted in a display stage, the direction of electric fields driving liquid crystal to rotate and formed by adjacent pixel units in the second direction Y are different, which may drive the liquid crystal to select toward different directions, and compensate the viewing angle in different directions, thereby forming a wide viewing angle.

Please continue referring to FIG. 3, the integrated touch display panel in this embodiment further includes multiple strip-shaped common electrodes 14 which serves as touch drive electrodes in a touch stage. Specifically, the multiple strip-shaped common electrodes 14 extend along the second direction Y and are arranged along the first direction X. Generally, a driver IC 16 is further disposed on one side of the first substrate 10 along the second direction Y. The strip-shaped common electrodes extending along the second direction Y may be directly connected to the driver IC 16 by means of shorter leads without connecting the driver IC from the left side or right side of FIG. 3 by means of longer leads. Therefore, signal transmission resistance may be reduced, and signal detection accuracy may be improved. Of course, in other embodiments, the strip-shaped common electrodes may extend along other directions.

Please continue referring to FIG. 2, in this embodiment, the integrated touch display panel further includes a second substrate 20 arranged oppositely to the first substrate 10. Specifically, the second substrate 20 is a color film substrate, and a black matrix and a color resist or the like are also disposed on the surface of one side of the second substrate 20 facing to the first substrate 10. On the surface of one side of the second substrate 20, there is provided with multiple strip-shaped detection electrodes 21 extending along the first direction X and arrayed along the second direction Y. In a touch stage, a touch position may be calculated out by detecting signal on the strip-shaped detection electrodes 21.

Frame sealing glue 40 is disposed at the edges of the opposite surfaces of the first substrate 10 and the second substrate 20. In the manufacturing process of the display panel, the frame sealing glue 40 is generally coated at the edges of the first substrate and the second substrate and then cured by ultraviolet rays.

A liquid crystal layer 30 is sandwiched in accommodating space formed among the first substrate 10, the second substrate 20 and the frame sealing glue 40.

In the integrated touch display panel provided in this embodiment, there exists at least one scanning line, and pull up/pull down characteristics of the pull up transistor/pull down transistor of the shift register unit connected with the at least one scanning line are different from pull up/pull down characteristics of the pull up transistor/pull down transistor of the shift register unit connected with a scanning line adjacent to the at least one scanning line.

Figure 5A:
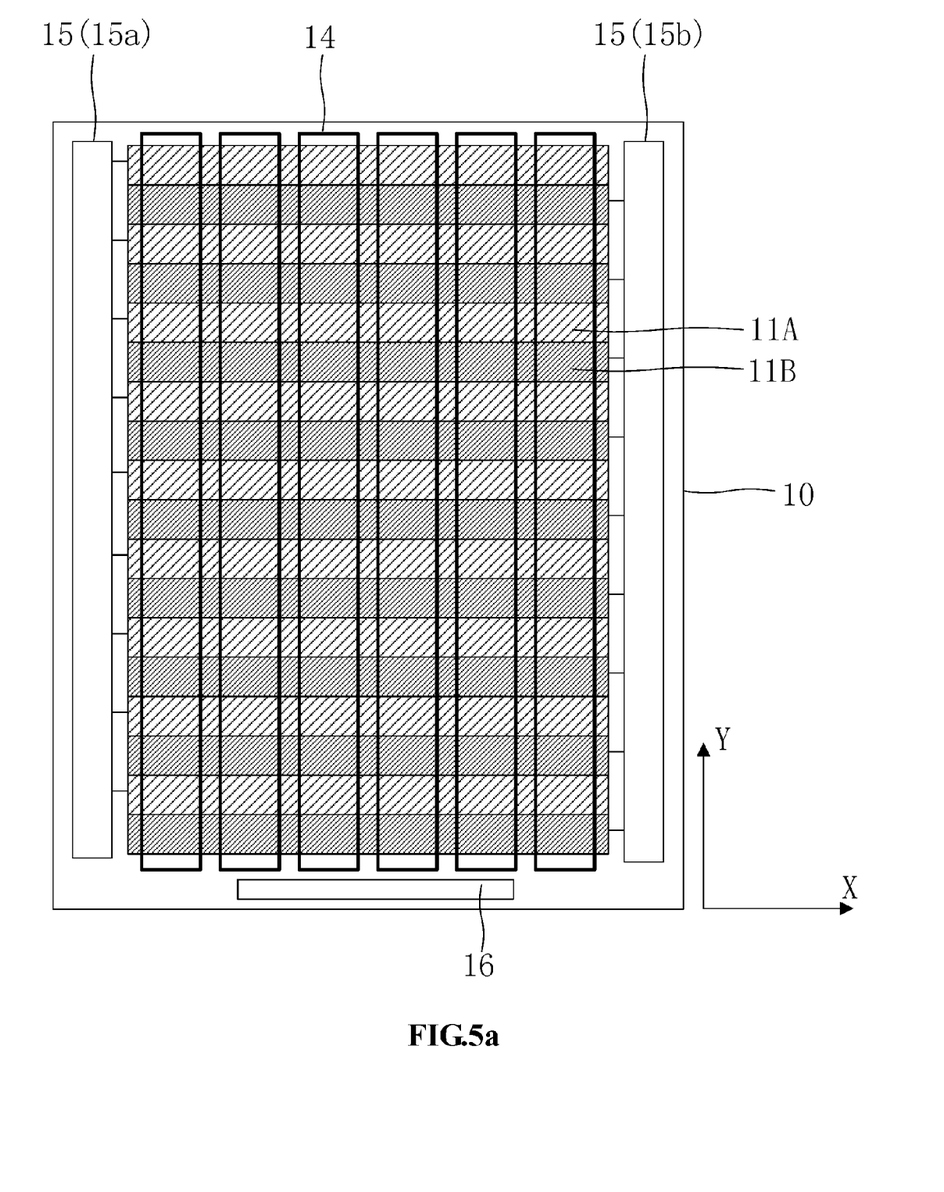
FIG. 5a is a monochrome display effect view of the integrated touch display panel to which no polarizer is adhered in FIG. 1.

Specifically, please refer to FIG. 5a, which is a monochrome display effect view of the display panel to which no polarizer is adhered in this embodiment. Reference will be made by taking two rows of pixel units connected with the scanning lines 11A and 11B as an example. The scanning line 11A is adjacent to the scanning line 11B, the scanning line 11A is connected to the first gate drive circuit 15a, and the scanning line 11B is connected to the second gate drive circuit 15b.

Since ultraviolet rays are used for curing the frame sealing glue in its curing process, irradiation of the ultraviolet rays will have an effect on semiconductors in the irradiation area, thereby affecting photoelectric characteristics of the semiconductors.

In this embodiment, the shift register units connecting the scanning line 11A and the scanning line 11B are respectively positioned on the left side and right side of the first substrate 10 in the Figures, so these two shift register units are relatively far away from each other. In the process of curing the frame sealing glue by ultraviolet rays, transistors included in the shift register units connecting these two scanning lines are different in deterioration degree. In this embodiment, all the transistors included in the display unit are NMOS transistors. The transistors are switched off at a low level and switched on at a high level, and the gate threshold voltage is −5V. When the gate voltage is higher than −5V, leakage current flows through semiconductors.

Due to irradiation of the ultraviolet rays, the pull up characteristics of the pull up transistors or the pull down characteristics of the pull down transistors of the shift register units connecting the scanning lines 11A and 11B are slightly different. That is, when the same input signal is inputted into the shift register units connecting the scanning lines 11A and 11B, values of high level signal outputted by them are not equal, one value is higher and the other value is lower. And when the same input signal is inputted into the shift register units connecting the scanning lines 11A and 11B, values of low level signal outputted by them are not equal, one value is higher and the other value is lower.

Therefore, when touch signal is inputted into the strip-shaped common electrode 14, the scanning lines 11A and 11B are in an off state. However, voltages on these two scanning lines are different, because the shift register units connected with these two scanning lines are different in output characteristics. For example, the voltage on the scanning line 11A is −5.1V, and the voltage on the scanning line 11B is −6V. When the touch signal is inputted, coupling capacitance is formed between the scanning line and the common electrode, and the voltage on the scanning line is raised, where the raised voltage is different because the original voltage is different. For example, when the coupling voltage is 0.2V, the voltage on the scanning line 11A is −4.9V, and the voltage on the scanning line 11B is −5.8V. At the moment, the voltage on the scanning line 11A is higher than the threshold voltage of the NMOS transistor, which may induce source-drain current on the thin film transistor in the pixel unit connected to the scanning line 11A, thereby causing electric leakage of the pixel electrode. Also at the moment, when the monochrome display is performed, the display colors of the pixels connected to the scanning lines 11A and 11B are slightly different, which causes transverse fringes. Referring to FIG. 5a, when no polarizer is adhered to the integrated touch display panel, the pixel units connected to the scanning lines 11A and 11B are different in brightness, i.e., the maximum brightness of the pixel unit connected to the scanning line 11A is denoted by A1, and the maximum brightness of the pixel unit connected to the scanning line 11B is denoted by B1, where A1 is greater than B1.

Please continue referring to FIG. 2, the integrated touch display panel provided in this embodiment further includes a first polarizer 50 positioned on the surface of the first substrate 10 far from the second substrate 20, the first polarizer 50 has a first transmittance axis T1; and a second polarizer 60 positioned on the surface of the second substrate 20 far from the first substrate 10, the second polarizer 60 has a second transmittance axis T2.

More specifically, in this embodiment, referring to FIG. 4b, the included angle between an extension direction of the first transmittance axis T1 and an extension direction D1 of the first strip-shaped pixel electrode is $\alpha$, and the included angle between the extension direction of the first transmittance axis T1 and the extension direction of the second strip-shaped pixel electrode is $\beta$, where $\alpha$ is not equal to $\beta$. In this embodiment, the extension direction of the first transmittance axis T1 is perpendicular to the one of the second transmittance axis T2. Since the first strip-shaped pixel electrode 132a and the second strip-shaped pixel electrode 132b are designed symmetrically, when the same pixel voltage is applied to the first strip-shaped pixel electrode 132a and the second strip-shaped pixel electrode 132b, a first electric field is formed between the first strip-shaped pixel electrode 132a and the common electrode, and a second electric field is formed between the second strip-shaped pixel electrode 132b and the common electrode. The first electric field and the second electric field are equal in magnitude and symmetrically with respect to the first direction. At the moment, rotation angles of liquid crystal molecules at the first pixel unit 13a and the second pixel unit 13b are equal in magnitude and opposite in direction, so optical rotation effect of light rays penetrating through the liquid crystal layer is the same. At the moment, if the included angle between the first strip-shaped pixel electrode 132a and the first transmittance axis T1 is equal to the one between the second strip-shaped pixel electrode 132b and the first transmittance axis T1, the two pixel units are equal in brightness. Because $\alpha$ is not equal to $\beta$, arrangement of the polarizers in this embodiment may enable two adjacent pixel units show different brightness under the same driving voltage, thereby forming interference fringes.

Figure 5B:
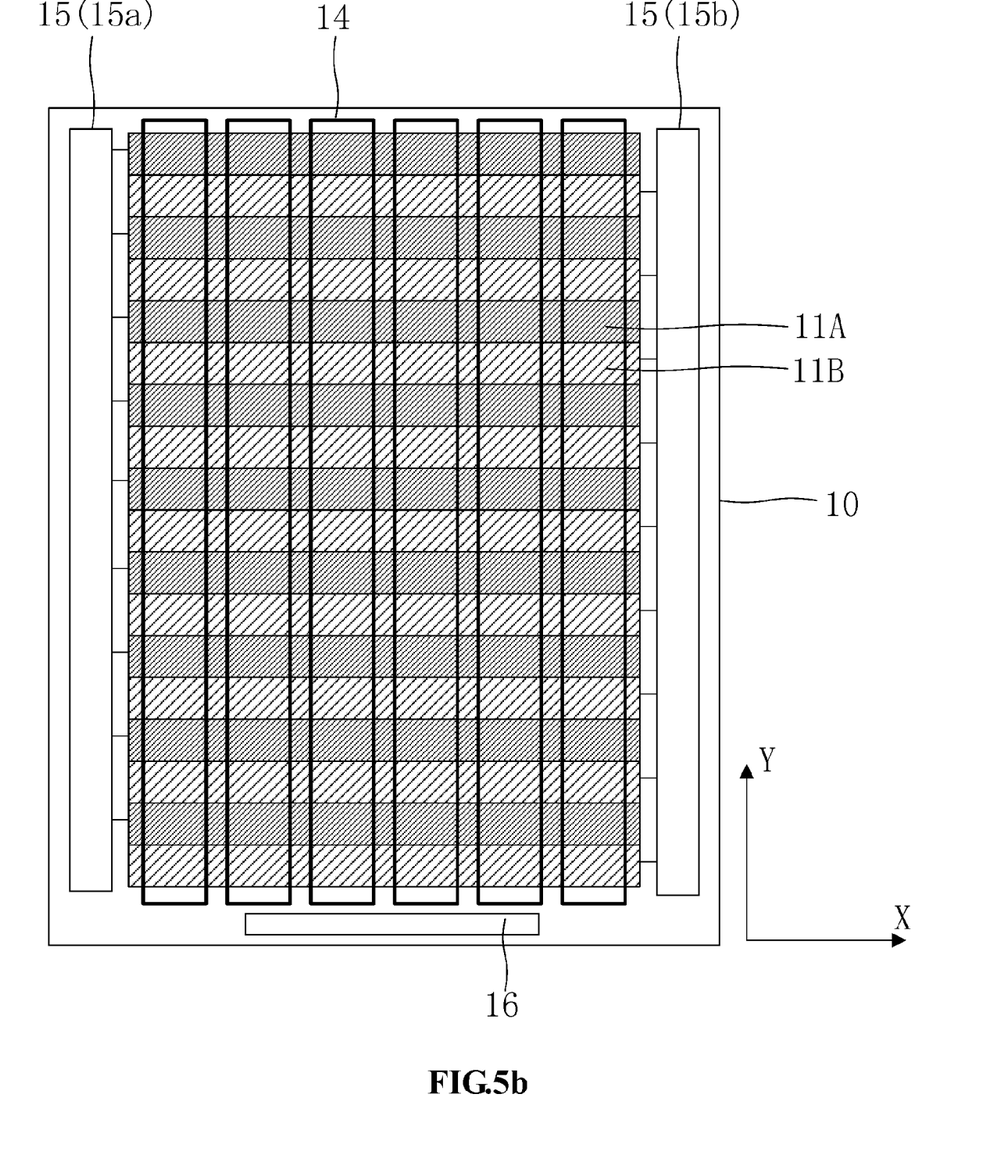
FIG. 5b is a schematic view of interference fringes of the integrated touch display panel in FIG. 1.

Please refer to FIG. 5b, which is a schematic view of interference fringes of the display panel provided in this embodiment. Reference will be made by still taking adjacent pixel units connected to the scanning lines 11A and 11B as an example. After the angle of the polarizer is adjusted, the brightness of the interference fringes of the pixel unit connected to the scanning line 11A is A2, and the brightness of the interference fringes of the pixel unit connected to the scanning line 11B is B2, where A2 is smaller than B2.

Figure 5C:
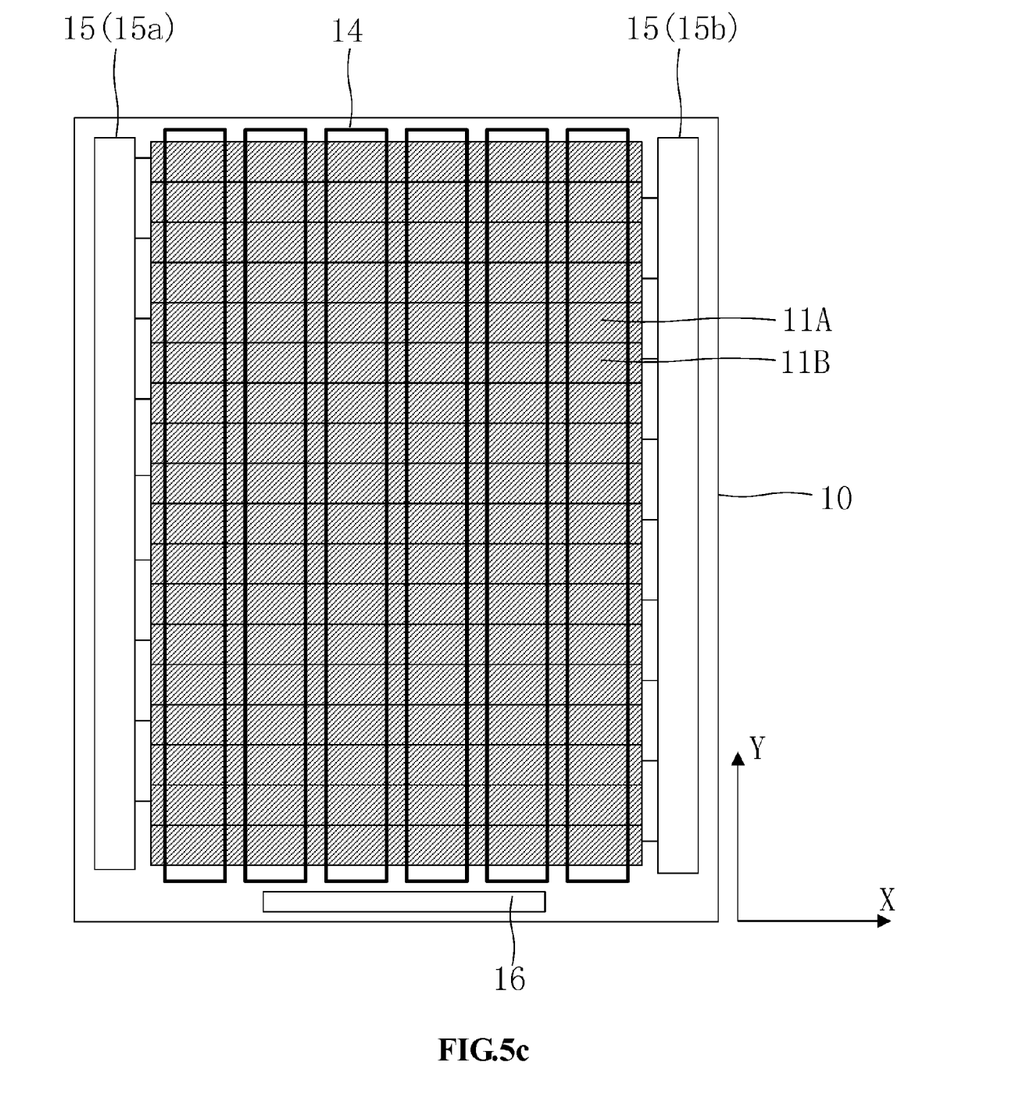
FIG. 5c is a display effect of the integrated touch display panel in FIG. 1.

The final display effect shown by the integrated touch display panel provided in this embodiment is superposition of two display effects. FIG. 5c is a display effect of the integrated touch display panel provided in this embodiment. The maximum brightness of the pixel unit connected to the scanning line 11A is A, and the maximum brightness of the pixel unit connected to the scanning line 11B is B, where A=A1+A2, B=B1+B2. Because A1>B1 and A2<B2, |A−B|/A<|A1−B1|/A1, and |A−B|/A<|A2−B2|/A2. That is, for final display, the brightness difference between the pixel unit connected to the scanning line 11A and the pixel unit connected to the scanning line 11B is smaller than that between two rows of pixel units to which no polarizer is adhered. And for final display, the brightness difference between two rows of pixel units is smaller than that between two adjacent interference fringes. In other words, the final display effect is superior to the display effect in the related art.

Still further, values of $\alpha$ and $\beta$ may be adjusted so that $0.94 \leq B/A \leq 1.06$, namely, the brightness difference between two adjacent rows of pixel units is within 6%. The distinguishing ability of the human eye to the brightness difference within 6% is weak, so bright and dark fringes are almost invisible in macroscopic display.

Optionally, $|\alpha-\beta|<1°$, at the moment, in the process of adhering the polarizer, no large dislocation is generated, no large interlacing is caused at the edges of the polarizer and the display panel.

In some other embodiments, since the pull up/pull down characteristics of the pull up transistors/pull down transistors of the shift register units positioned at two sides are different, bright and dark fringes may appear on the whole display panel to which no polarizer is adhered. Fringes of the whole integrated touch display panel may be adjusted, because the polarizer is adhered to the whole panel. That is, the average maximum brightness of the pixel unit connected with the gate drive circuit at one side is A', and the average maximum brightness of the pixel unit connected with the gate drive circuit at the other side is B', where $0.94 \leq B'/A' \leq 1.06$.

By means of the integrated touch display panel in combination with the integrated touch display function and a pseudo dual-domain pixel structure and in coordination with arrangement of polarizers at the outer side of the display panel, the display panel is enabled to generate horizontal interference fringes, which will be counteracted, which horizontal coupling fringes generated by different transistor characteristics of the shift registers in the gate drive circuit through mutual interference, so that the difference of the brightness transmittance between odd rows of data lines and even rows of data lines under the same signal becomes smaller, thereby improving the display effect.

It is to be noted that reference is made by taking an NMOS transistor as an example in this embodiment. However, in some other embodiments, a PMOS transistor may also be used, so the present disclosure is not limited by the contents of this embodiment.

In addition, in some other embodiments, when the strip-shaped common electrodes extend along the first direction, in addition to possibly using the present disclosure in combination with polarizer adherence to improve the display effect, adjustment of fringes may also be achieved by integrated adjustment of scanning line driving voltage. In this embodiment, since the strip-shaped common electrodes extend along the second direction, when the strip-shaped common electrodes input touch signal, coupling is only produced at a part overlapped with the scanning line instead of coupling with the whole transverse scanning line. Therefore, it is unable to solve this technical problem by integrated adjustment of scanning line high driving voltage. However, this technical problem may be solved by means of arrangement of the transmittance axis in combination with the polarizer, and the display effect is improved.

Figure 6:
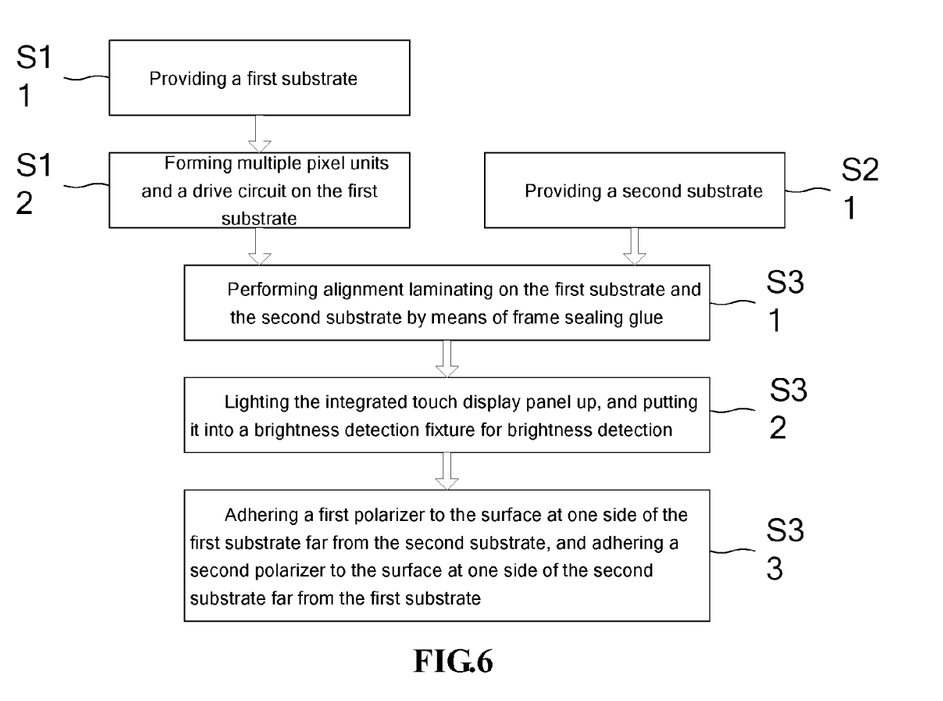
FIG. 6 is a schematic flow view of a manufacturing method of an integrated touch display panel according to an embodiment of the present disclosure.

Please refer to FIG. 6, which is a schematic flow view of a manufacturing method of an integrated touch display panel according to an embodiment of the present disclosure.

The method includes Step S11: provide a first substrate. The first substrate is a glass substrate. In other embodiments, the first substrate also may be other transparent substrates, for example, a quartz substrate.

At step S12: multiple pixel units and a drive circuit on the first substrate are formed. Specifically, referring to FIG. 2 and FIG. 3, the pixel unit 13 is positioned in the display area on the first substrate 10, and the pixel unit 13 is defined by making two adjacent scanning lines 11 and two adjacent data lines 12 intersect. The scanning lines 11 extend along the first direction X, and the data lines 12 extend along the second direction Y. The first direction X is perpendicular to the second direction Y. The gate drive circuit 15 is positioned at the edges of two sides of the first substrate 10 parallel to the second direction Y. The gate drive circuit 15 includes multiple cascade-connected shift register units 151. The shift register unit 151 includes a pull down transistor and a pull up transistor. The multiple scanning lines 11 are alternately connected to the gate drive circuit 15 positioned at the edges of two sides, and each of the scanning lines 11 is connected with a shift register unit 151.

Continuing referring to FIG. 4b, the pixel unit 13 includes a first pixel unit 13a and a second pixel unit 13b which are adjacent along the second direction Y. The first pixel unit 13a includes a first strip-shaped pixel electrode 132a, and the second pixel unit 13b includes a second strip-shaped pixel electrode 132b. The extension direction of the first strip-shaped pixel electrode 132a and the extension direction of the second strip-shaped pixel electrode 132b are essentially symmetrical with respect to the first direction X. The first pixel unit 13a is connected to the scanning line connected with a first gate drive circuit 15a, and the second pixel unit 13b is connected to the scanning line connected with a second drive circuit 15b.

Further referring to FIG. 5a to FIG. 5b, there exists at least one scanning line, and pull up/pull down characteristics of the pull up transistor/pull down transistor of the shift register unit connected with the at least one scanning line are different from pull up/pull down characteristics of the pull up transistor/pull down transistor of the shift register unit connected with a scanning line adjacent to the at least one scanning line.

Multiple strip-shaped common electrodes 14 serve as touch drive electrodes in a touch stage.

At step S21: a second substrate is provided. More specifically, after providing the second substrate, the method further includes forming a black matrix and a color resist or the like on the second substrate. Multiple strip-shaped detection electrodes are formed on the surface of the second substrate, and the multiple strip-shaped detection electrodes extend along the first direction and are arranged along the second direction. With respect to structural setting of electrodes, related description of other embodiments in the present disclosure may be referred to, which is not repeated any more herein.

At step S31: alignment laminating on the first substrate and the second substrate is performed by means of a frame sealing glue. Specifically, the frame sealing glue is disposed at the edges of the opposite surfaces of the first substrate and the second substrate, and a liquid crystal layer is disposed in accommodating space formed among the first substrate, the second substrate and the frame sealing glue.

At step S32: the integrated touch display panel up is lighted, and is put into a brightness detection fixture for brightness detection. Specifically, the method includes: lighting the integrated touch display panel up, and putting it into a brightness detection fixture, and then measured that the maximum brightness of a row of pixel units connected with the at least one scanning line is M, and the maximum brightness of a row of pixel units connected with the scanning line adjacent to the at least one scanning line is N, M is not equal to N, where the brightness detection fixture includes two polarizers positioned at two sides of the integrated touch display panel, and transmittance axes of the two polarizers are perpendicular to each other. The transmittance axes of the two polarizers of the brightness detection fixture are strictly perpendicular to each other, so by rotating the integrated touch display panel, the optimum included angles $\alpha$ and $\beta$ between the extension directions of the transmittance axes and that of the electrodes, which enable the brightness difference between two adjacent rows of pixel units on the integrated touch display panel to be the minimum, may be found.

After the maximum brightness and the optimum angle $\alpha$ and $\beta$ are obtained, step S33 is performed. At step 33, a first polarizer is adhered to the surface of the first substrate far from the second substrate, and a second polarizer is adhered to the surface of the second substrate far from the first substrate. Specifically, the first polarizer has a first transmittance axis, and the second polarizer has a second transmittance axis. After the polarizers are adhered, the included angle between the extension direction of the first transmittance axis and the extension direction of the first strip-shaped pixel electrode is $\alpha$, and the included angle between the extension direction of the second transmittance axis and the extension direction of the second strip-shaped pixel electrode is $\beta$, where $\alpha$ is not equal to $\beta$. And the extension direction of the first transmittance axis is perpendicular to that of the second transmittance axis.

By means of such a structural setting in combination with the integrated touch display function and a pseudo dual-domain pixel structure and in coordination with arrangement of polarizers at the outer side of the display panel, the display panel is enabled to generate horizontal interference fringes, which will be counteracted with horizontal coupling fringes generated by different transistor characteristics of the shift registers in the gate drive circuit through mutual interference, so that the difference of the brightness transmittance between odd rows of data lines and even rows of data lines under the same signal becomes smaller, thereby improving the display effect.

Still further, the integrated touch display panel manufactured by means of this method enables the maximum brightness of a row of pixel units connected with the at least one scanning line to be A and the maximum brightness of a row of pixel units connected with the scanning line adjacent to the at least one scanning line to be B, where $0.94 \leq B/A \leq 1.06$. Still further, the average maximum brightness of the pixel unit connected with the gate drive circuit at one side is A', and the average maximum brightness of the pixel unit connected with the gate drive circuit at the other side is B', where $0.94 \leq B'/A' \leq 1.06$.

The related structure part may refer to the relevant accompanying drawings and the corresponding description of another embodiment in the present disclosure, which is not repeated any more herein. By means of the integrated touch display panel obtained by this manufacturing method in combination with the integrated touch display function and a pseudo dual-domain pixel structure and in coordination with arrangement of polarizers at the outer side of the display panel, the display panel is enabled to generate horizontal interference fringes, which will be counteracted with horizontal coupling fringes generated by different transistor characteristics of the shift registers in the gate drive circuit, so that the difference of the brightness transmittance between odd rows of data lines and even rows of data lines under the same signal becomes smaller, thereby improving the display effect.

The above content is further detailed description of the present disclosure by reference to specific embodiments. However, it is not affirmed that concrete implementation of the present disclosure is merely limited to these descriptions. For persons of ordinary skill in the art of the present disclosure, some simple derivations or substitutions may be made without departing from the inventive concept, and shall be regarded as falling within the scope of protection of the present disclosure.

The invention claimed is:

1. An integrated touch display panel, comprising:
a first substrate, multiple pixel units, a gate drive circuit, multiple strip-shaped common electrodes, a second substrate, a frame sealing glue and a liquid crystal layer; and, wherein
the multiple pixel units are disposed in a display area on the first substrate, each of the multiple pixel units being limited by an intersection of two adjacent scanning lines of multiple scanning lines and two adjacent data lines of multiple data lines, wherein the multiple scanning lines extend along a first direction, the multiple data lines extend along a second direction, wherein the first direction is perpendicular to the second direction;
the gate drive circuit comprises a first gate drive circuit positioned at an edge of a first side of the first substrate and a second gate drive circuit positioned at an edge of a second side of the first substrate, the first side and the second side being parallel to the second direction, wherein each of the first gate drive circuit and the second gate drive circuit comprises multiple cascade-connected shift register units, each of the multiple shift register units comprising a pull down transistor and a pull up transistor, and wherein the multiple scanning lines are alternately connected to the first gate drive circuit and the second gate drive circuit, and each of the multiple scanning lines is connected with one of the multiple shift register units;
the multiple pixel units comprise a first pixel unit and a second pixel unit, the first pixel unit and a second pixel unit being adjacent along the second direction, wherein the first pixel unit comprises a first strip-shaped pixel electrode, the second pixel unit comprises a second strip-shaped pixel electrode, an extension direction of the first strip-shaped pixel electrode and an extension direction of the second strip-shaped pixel electrode are symmetrical or substantially symmetrical with respect to the first direction, the first pixel unit is connected to a scanning line connected with the first gate drive circuit, and the second pixel unit is connected to a scanning line connected with the second gate drive circuit;
the pull up transistor of at least one of the shift register units connected with a first scanning line have pull up characteristics that are different from pull up characteristics of the pull up transistor of a shift register unit connected with a second scanning line adjacent to the first scanning line, or the pull down transistor of the at least one of the shift register units connected with the first scanning line has pull down characteristics that are different from pull down characteristics of the pull down transistor of the shift register unit connected with the second scanning line adjacent to the first scanning line;
the multiple strip-shaped common electrodes serve as touch drive electrodes in a touch stage;
the second substrate are arranged oppositely to the first substrate;
the frame sealing glue is disposed on edges of a t surface of the first substrate and a surface of the second substrate opposite to each other; and
a liquid crystal layer sandwiched in accommodating space formed among the first substrate, the second substrate and the frame sealing glue.

2. The integrated touch display panel according to claim 1, further comprising a first polarizer and a second polarizer, wherein
the first polarizer is disposed on a surface of the first substrate far from the second substrate and has a first transmittance axis; and
the second polarizer is disposed on a surface of the second substrate far from the first substrate, and has a second transmittance axis.

3. The integrated touch display panel according to claim 2, wherein an included angle between an extension direction of the first transmittance axis and the extension direction of the first strip-shaped pixel electrode is $\alpha$, and the included angle between the extension direction of the first transmittance axis and the extension direction of the second strip-shaped pixel electrode is $\beta$, wherein $\alpha$ is not equal to $\beta$.

4. The integrated touch display panel according to claim 2, wherein the extension direction of the first transmittance axis is perpendicular to that of the second transmittance axis.

5. The integrated touch display panel according to claim 2, wherein a maximum brightness of a row of pixel units connected with the at least one scanning line is A, and the maximum brightness of a row of pixel units connected with a scanning line adjacent to the at least one scanning line is B, wherein $0.94 \leq B/A \leq 1.06$.

6. The integrated touch display panel according to claim 2, wherein the pull up characteristics of the pull up transistor of one of the shift register units of the first drive circuit are different from the pull up characteristics of the pull up transistor of one of the shift register units of the second drive circuit, or the pull down characteristics of the pull down transistor of one of the shift register units of the first drive circuit are different from the pull down characteristics of the pull down transistor of one of the shift register units of the second drive circuit.

7. The integrated touch display panel according to claim 6, wherein an average maximum brightness of a pixel unit connected with the gate drive circuit at one side is A', and an average maximum brightness of a pixel unit connected with the gate drive circuit at the other side is B', wherein 0.94≤B'/A'≤1.06.

8. The integrated touch display panel according to claim 1, wherein the multiple strip-shaped common electrodes extend along the second direction and are arranged along the first direction.

9. The integrated touch display panel according to claim 1, wherein multiple strip-shaped detection electrodes are disposed on a surface of the second substrate, the multiple strip-shaped detection electrodes extend along the first direction and are arranged along the second direction.

10. A manufacturing method of an integrated touch display panel, comprising:
providing a first substrate;
forming multiple pixel units and a drive circuit on the first substrate;
providing a second substrate; and
performing alignment laminating on the first substrate and the second substrate by means of frame sealing glue, wherein the frame sealing glue is disposed on edges of a t surface of the first substrate and a surface of the second substrate opposite to each other; and a liquid crystal layer is sandwiched in accommodating space formed among the first substrate, the second substrate and the frame sealing glue; and, wherein
the pixel units are disposed in a display area on the first substrate, each of the multiple pixel units being limited by an intersection of two adjacent scanning lines of multiple scanning lines and two adjacent data lines of multiple data lines, wherein the multiple scanning lines extend along a first direction, the multiple data lines extend along a second direction, wherein the first direction is perpendicular to the second direction;
the gate drive circuit comprises a first gate drive circuit positioned at an edge of a first side of the first substrate and a second gate drive circuit positioned at an edge of a second side of the first substrate, the first side and the second side being parallel to the second direction, wherein each of the first gate drive circuit and the second gate drive circuit comprises multiple cascade-connected shift register units, each of the multiple shift register units comprising a pull down transistor and a pull up transistor, and wherein the multiple scanning lines are alternately connected to the first gate drive circuit and the second gate drive circuit, and each of the multiple scanning lines is connected with one of the multiple shift register units;
the multiple pixel units comprise a first pixel unit and a second pixel unit, the first pixel unit and a second pixel unit being adjacent along the second direction, wherein the first pixel unit comprises a first strip-shaped pixel electrode, the second pixel unit comprises a second strip-shaped pixel electrode, an extension direction of the first strip-shaped pixel electrode and an extension direction of the second strip-shaped pixel electrode are symmetrical or substantially symmetrical with respect to the first direction, the first pixel unit is connected to a scanning line connected with the first gate drive circuit, and the second pixel unit is connected to a scanning line connected with the second gate drive circuit;
the pull up transistor of at least one of the shift register units connected with a first scanning line have pull up characteristics that are different from pull up characteristics of the pull up transistor of a shift register unit connected with a second scanning line adjacent to the first scanning line, or the pull down transistor of the at least one of the shift register units connected with the first scanning line has pull down characteristics that are different from pull down characteristics of the pull down transistor of the shift register unit connected with the second scanning line adjacent to the first scanning line; and
the multiple strip-shaped common electrodes serve as touch drive electrodes in a touch stage.

11. The manufacturing method according to claim 10, wherein after performing alignment laminating on the first substrate and the second substrate, the method further comprises:
lighting the integrated touch display panel up, and putting it into a brightness detection fixture, and then measuring that a maximum brightness of a row of pixel units connected with the at least one scanning line is M, and the maximum brightness of a row of pixel units connected with a scanning line adjacent to the at least one scanning line is N, M is not equal to N, wherein the brightness detection fixture comprises two polarizers positioned at two sides of the integrated touch display panel, and transmittance axes of the two polarizers are perpendicular to each other;
adhering a first polarizer to a surface of the first substrate far from the second substrate, the first polarizer has a first transmittance axis; and
adhering a second polarizer to a surface of the second substrate far from the first substrate, and the second polarizer has a second transmittance axis.

12. The manufacturing method according to claim 11, wherein an included angle between an extension direction of the first transmittance axis and the extension direction of the first strip-shaped pixel electrode is α, an included angle between an extension direction of the second transmittance axis and the extension direction of the second strip-shaped pixel electrode is β, wherein α is not equal to β.

13. The manufacturing method according to claim 11, wherein the extension direction of the first transmittance axis is perpendicular to that of the second transmittance axis.

14. The manufacturing method according to claim 11, wherein a maximum brightness of a row of pixel units connected with the at least one scanning line is A, and the maximum brightness of a row of pixel units connected with a scanning line adjacent to the at least one scanning line is B, wherein 0.94≤B/A≤1.06.

15. The manufacturing method according to claim 11, wherein the pull up characteristics of the pull up transistor of one of the shift register units of the first drive circuit are different from the pull up characteristics of the pull up transistor of one of the shift register units of the second drive circuit, or the pull down characteristics of the pull down transistor of one of the shift register units of the first drive circuit are different from the pull down characteristics of the pull down transistor of one of the shift register units of the second drive circuit.

16. The manufacturing method according to claim 15, wherein an average maximum brightness of a pixel unit connected with the gate drive circuit at one side is A', and an average maximum brightness of a pixel unit connected with the gate drive circuit at the other side is B', wherein $0.94 \leq B'/A' \leq 1.06$.

17. The manufacturing method according to claim 10, wherein the multiple strip-shaped common electrodes extend along the second direction and are arranged along the first direction.

18. The manufacturing method according to claim 10, wherein the providing the second substrate comprises: forming multiple strip-shaped detection electrodes on a surface of the second substrate, the multiple strip-shaped detection electrodes extend along the first direction and are arranged along the second direction.

\* \* \* \* \*